United States Patent
Lamarre

(10) Patent No.: US 11,120,606 B1
(45) Date of Patent: Sep. 14, 2021

(54) SYSTEMS AND METHODS FOR IMAGE TEXTURE UNIFORMIZATION FOR MULTIVIEW OBJECT CAPTURE

(71) Applicant: Electronic Arts Inc., Redwood City, CA (US)

(72) Inventor: Mathieu Lamarre, Montreal (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/857,655

(22) Filed: Apr. 24, 2020

(51) Int. Cl.
| | |
|---|---|
| *G06T 3/40* | (2006.01) |
| *G06T 7/529* | (2017.01) |
| *G06T 7/593* | (2017.01) |
| *G06T 15/04* | (2011.01) |

(52) U.S. Cl.
CPC ............ *G06T 15/04* (2013.01); *G06T 3/4038* (2013.01); *G06T 7/529* (2017.01); *G06T 7/596* (2017.01)

(58) Field of Classification Search
CPC ....... G06T 3/4023; G06T 3/4038; G06T 7/50; G06T 7/529; G06T 7/55; G06T 7/596; G06T 15/04; G06T 2207/20016
See application file for complete search history.

(56) References Cited

U.S. PATENT DOCUMENTS

| | | | | |
|---|---|---|---|---|
| 9,838,614 | B1 * | 12/2017 | Brailovskiy | ............ H04N 5/265 |
| 2014/0003711 | A1 * | 1/2014 | Ngan | ........................ G06T 7/11 |
| | | | | 382/164 |
| 2015/0324662 | A1 * | 11/2015 | Garg | ........................ G06T 7/90 |
| | | | | 382/165 |
| 2017/0064284 | A1 | 3/2017 | Auclair et al. | |
| 2020/0344399 | A1 * | 10/2020 | Chen | .................... H04N 5/2355 |

OTHER PUBLICATIONS

Chen, Zhaolin, et al. "3D texture mapping in multi-view reconstruction." International Symposium on Visual Computing. Springer, Berlin, Heidelberg, 2012 (Year: 2012).*
Burt et al., "A Multiresolution Spline With Application to Image Mosaics," ACM Transactions on Graphics, vol. 2, No. 4, pp. 217-236 (Oct. 1983).
Pérez et al. "Poisson Image Editing," ACM Transactions on Graphics, vol. 22, No. 3, pp. 313-318 (Jul. 2003).

(Continued)

*Primary Examiner* — Diane M Wills
(74) *Attorney, Agent, or Firm* — Leydig, Voit & Mayer, Ltd.

(57) ABSTRACT

An image processing method is disclosed, comprising: receiving a plurality of images of an object; and, for each image, determining a brightness value for each point on the object that is visible, and generating a tile grid for the image. Each point that is visible in an image corresponds to one tile in the tile grid. For each tile pair where at least one point is visible in both tiles of the tile pair, a brightness offset value is determined. For each image, an offset matrix is generated. Values of the offset matrix comprise brightness offsets to apply to each tile of a tile grid for the image to normalize the brightness of the image with the other images. A plurality of reconstructed images is generated based on performing, for each image, transformation operations on the given image based on the corresponding offset matrix to generate a reconstructed image.

18 Claims, 13 Drawing Sheets

(56) References Cited

OTHER PUBLICATIONS

Szeliski, Richard. "Computer Vision: Algorithms and Applications," Springer Science & Business Media, 1st Ed. (Sep. 3, 2010).
Stanford Exploration Project. "The Laplacian Pyramid," available at: http://sepwww.stanford.edu/data/media/public/sep/morgan/texturematch/paper_html/node3.html (Jan. 25, 2002).

* cited by examiner

| Brightness of point 510 in image 502 [$Tile_{1,6,3}$] | — | Brightness of point 510 in image 504 [$Tile_{2,3,2}$] | = | Brightness difference of point 510 between image 502 and image 504 [$Tile_{1,6,3}$ and $Tile_{2,3,2}$] |
| Brightness of point 510 in image 502 [$Tile_{1,6,3}$] | — | Brightness of point 510 in image 506 [$Tile_{3,2,6}$] | = | Brightness difference of point 510 between image 502 and image 506 [$Tile_{1,6,3}$ and $Tile_{3,2,6}$] |
| Brightness of point 510 in image 504 [$Tile_{2,3,2}$] | — | Brightness of point 510 in image 506 [$Tile_{3,2,6}$] | = | Brightness difference of point 510 between image 504 and image 506 [$Tile_{2,3,2}$ and $Tile_{3,2,6}$] |

FIG. 5B

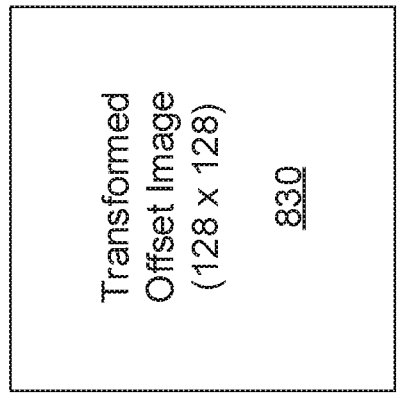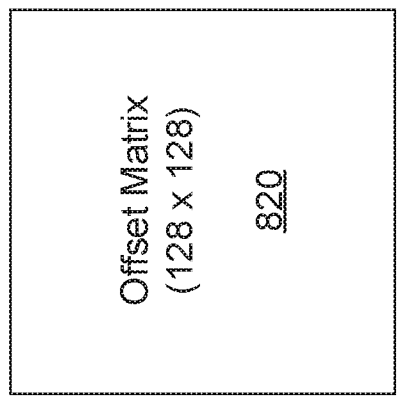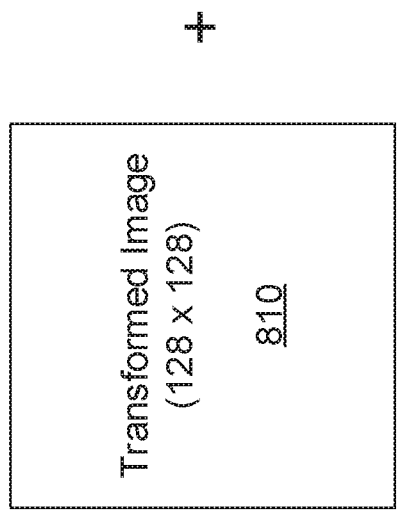
FIG. 8

SYSTEMS AND METHODS FOR IMAGE TEXTURE UNIFORMIZATION FOR MULTIVIEW OBJECT CAPTURE

FIELD

This disclosure generally relates to computer graphics and, more particularly, to systems and methods for image texture uniformization for multiview object capture.

BACKGROUND

In computer graphics, the concept of "texture mapping" involves mapping pixels from a two-dimensional (2D) "texture" to a three-dimensional (3D) surface (e.g., wrapping the 2D texture around the 3D surface). Texture mapping can be used for defining high frequency detail, surface texture, or color information on a computer-generated object or 3D model.

Various techniques exist for combining two or more 2D images to generate a combined 2D image. Example use cases include stitching together images in a panorama or combining two or more images to form a texture for texture mapping.

In the context of creating a texture from two or more images, one approach to combining the two or more images to create a texture involves identifying identical points of an object in two images to identify how the two images should be combined. However, conventional approaches for creating textures from multiple images have their drawbacks. While some techniques are able to generate textures that are dimensionally correct (i.e., correct shape and size), they fail to produce a uniform texture in terms of color and/or brightness of the resultant texture. As a result, adjacent points on the texture may have a different shade of color, a different contrast, and/or a different level of brightness. Therefore, after the texture is applied to a 3D object, the result might be dimensionally correct, but the appearance of the 3D object with the texture applied may not look uniform.

As such, there remains a need in the art for a system and method for image texture uniformization for multiview object capture that overcomes the drawbacks and limitations of existing approaches.

SUMMARY

The present disclosure generally relates a method, a device, and a computer-readable storage medium for image processing. Embodiments of the method, device, and computer-readable storage medium are summarized below. The method, device, and computer-readable storage medium summarized below may include additional, less, or alternate actions, including those discussed elsewhere herein.

In one embodiment, a method includes: receiving a plurality of images of an object; for each image in the plurality of images: determining a brightness value for each point in a set of points on the object that is visible in the image, and generating a tile grid for the image, wherein each point in the set of points on the object that is visible in the image corresponds to one tile in the tile grid; for each tile pair comprising a first tile from a first image and a second tile from a second image where at least one point on the object is visible in both the first tile and the second tile, determining a brightness offset value for the tile pair; for each image in the plurality of images, generating an offset matrix corresponding to the image, wherein values of the offset matrix for a given image comprise brightness offset values to apply to each tile of a tile grid for the given image to normalize the brightness of the given image with the other images in the plurality of images; generating a plurality of reconstructed images based on performing, for each image in the plurality of images, one or more transformation operations on the given image based on the corresponding offset matrix for the given image to generate a reconstructed image for the given image; and combining the plurality of reconstructed images to generate a texture to be applied to a three-dimensional model of the object.

BRIEF DESCRIPTION OF THE DRAWINGS

FIG. 5B illustrates an example for calculating the difference in brightness for the same point in different images, according to an embodiment.

FIG. 8 is a block diagram illustrating the creation of a decomposed offset image, according to an embodiment.

DETAILED DESCRIPTION

Figure 1:
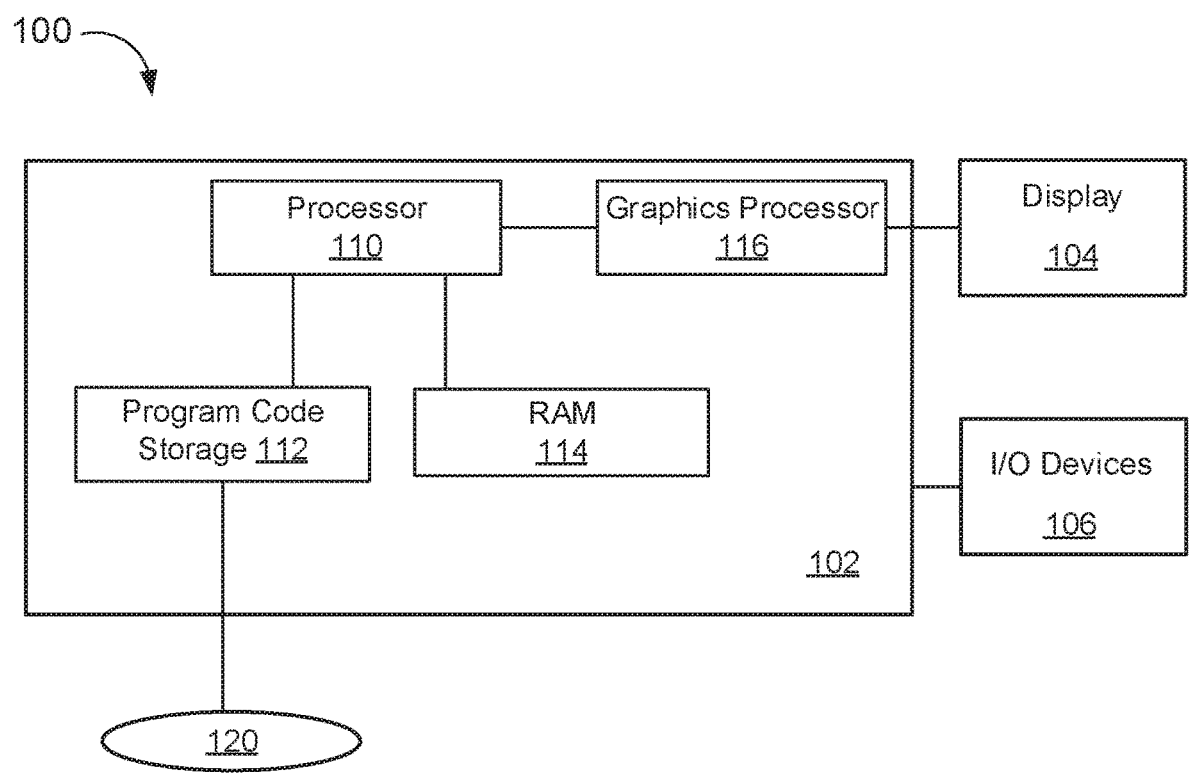
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of the disclosure provide a novel approach to generating a texture to be applied to a 3D object by combining two or more 2D images.

As discussed in greater detail herein, multiple 2D images of an object can be captured using one or more cameras. For each image, a set of points on the object that are visible in the image are determined. For each point that is visible in a given image, a brightness value is determined. In some embodiments, points may correspond to vertices or polygons associated with a 3D representation of the underlying object.

In some embodiments, a tile grid is overlaid on each image. Each point in the set of points that is visible in each image corresponds to one tile on the grid. Tile pairs are created between tiles of two images in which there is at least one common point visible in both of the tiles of the tile pair. A set of brightness differences are calculated between the points that are common to both tiles of the tile pair. In some embodiments, a median brightness difference is determined among the set of brightness differences for the tile pair. The median brightness different for the tile pair forms an equation among the tiles in the tile pair that defines an offset brightness to normalize the brightness among the tiles of the tile pair. Other embodiments may use a mean instead of a median to determine the brightness offset among tiles in a tile pair.

This process of computing brightness offsets among tile pairs can be repeated for the various images and tiles to generate set of equations based on the brightness offsets. The set of equations can be solved to generate a separate offset matrix for each image. The values of the offset matrix for a given image comprise brightness offset values to apply to each tile of a tile grid corresponding to the image to normalize the brightness of the image with the other images.

However, rather than applying the offset values directly to the pixels of an input image, in some embodiments, a set of transformation operations can be performed on each input image to generate transformed images of each image that have dimensions that equal the dimensions of the tile grid for each image. For each transformed image, the generated offset matrix for that image is applied to the transformed image to generate a transformed offset image. A set of inverse transformations is then performed on each transformed offset image to generate reconstructed images. The reconstructed images can then be combined generate a texture to be applied to a 3D representation of the object being captured by the one or more cameras. By applying brightness offset values to multiple 2D images of an object in a novel way, the disclosed embodiments create a texture for the object that has normalized brightness throughout the texture. Although one embodiment is described in the context of generating textures with normalized brightness, other embodiments can be used to, for example, generate textures with normalized color.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for image storage, brightness offset value calculations and storage, image transformation and inverse transformation operations, image reconstruction operations, texture generation, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
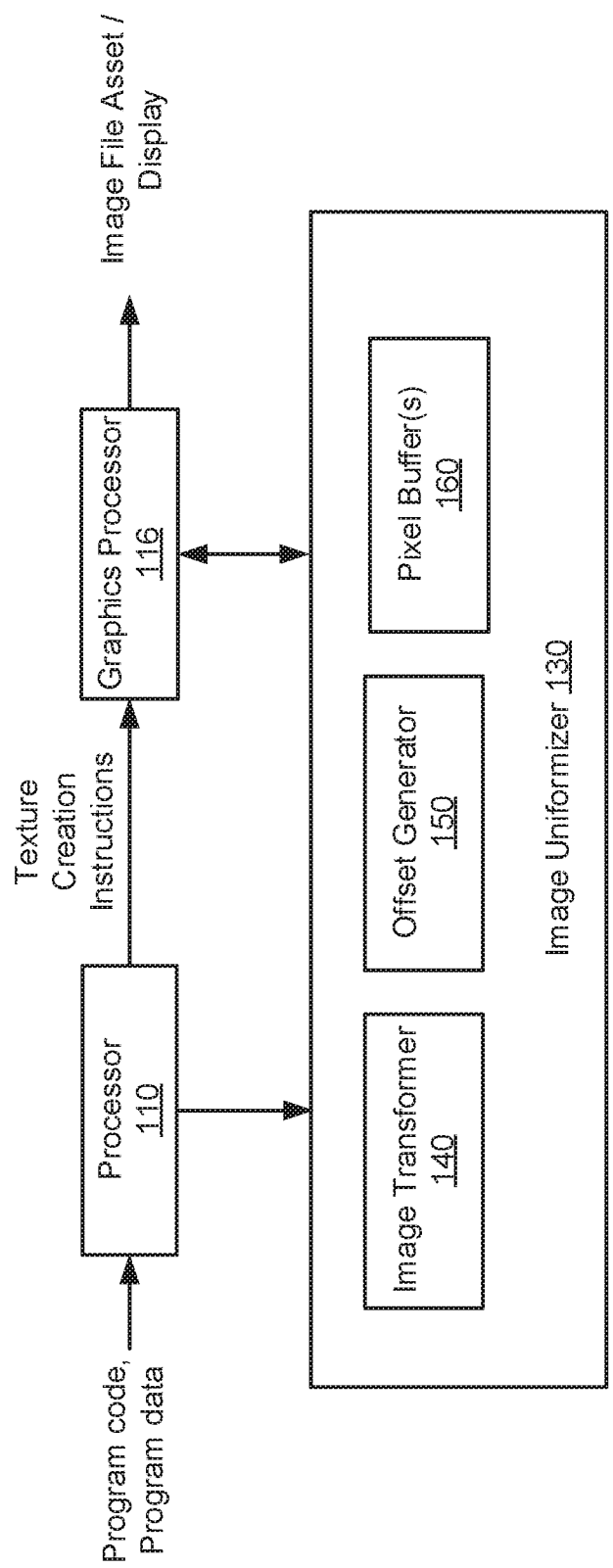
FIG. 2 is a block diagram illustrating the processor, graphics processor, and image uniformizer interaction, according to one embodiment.

FIG. 2 is a block diagram illustrating the processor 110, graphics processor 116, and image uniformizer 130 interaction, according to one embodiment. As shown in FIG. 2, processor 110 executes program code and program data. In response to executing the program code, processor 110 outputs texture creation instructions to graphics processor 116. Graphics processor 116, in turn, interacts with image uniformizer 130. The image uniformizer 130 may be implemented as software program code stored in a computer-readable storage medium that is executed by the processor 110, the graphics processor 116, or a combination of the processor 110 and the graphics processor 116.

In various embodiments, the image uniformizer 130 includes image transformer 130, offset generator 150, and pixel buffer(s) 160. The offset generator 150 is configured to apply a tile grid to high resolution input images of an object and generate offset matrices based on median brightness difference values between tile pairs corresponding to two images of the object that have at least one point that is visible on the object in each tile of the tile pairs. The image transformer 140 performs a set of transformation operations on high resolution input images to generate transformed images of the object that have dimensions equal the dimensions of the tile grids. The image reconstructor 160 applies the offset matrices to their corresponding transformed images, generates transformed offset images, and performs a set of inverse transformation operations on each transformed offset image to generate reconstructed high resolution images of the object. The graphic processor 116, in turn, interacts with the image uniformizer 130 to combine the reconstructed high resolution images of an object to output an image file asset (such as, for example, a texture to be applied to a 3D representation of the object) that can be ultimately displayed on a display device.

Alternatively, instead of sending texture creation instructions to the graphics processor 116 or in addition to sending texture creation instructions to graphics processor 116, processor 110 may directly interact with the image uniformizer 130. For example, processor 110 could determine which high resolution images of an object need uniformization and provide these images to the image uniformizer 130 to generate high resolution reconstructed images of the object for the graphics processor 116 to combine in order to generate the texture to be applied to the object.

In one example implementation, processor 110 issues high-level graphics commands to graphics processor 116. In some implementations, such high-level graphics commands might be those specified by the OpenGL, DirectX, Vulkan, or CUDA specification, or those specified by a graphics processor manufacturer, for example.

In one implementation of an image uniformization process, graphics processor 116 receives the reconstructed high resolution images of an object from the image uniformizer 130 and stitches the reconstructed high resolution images of the object together to create a normalized and seamless texture. For memory efficiency and speed, it may be preferable in some implementations to process the reconstructed high resolution images as a stream (as opposed to random access, or other ordering), so that fast, expensive memory used for the reconstructed high resolution images being processed is not required for all of the reconstructed high resolution images used to generate a uniform texture for the object. Other data structures, such as look-up tables, can be used in some embodiments to store brightness values for points that are visible in the various input images.

Figure 3A:
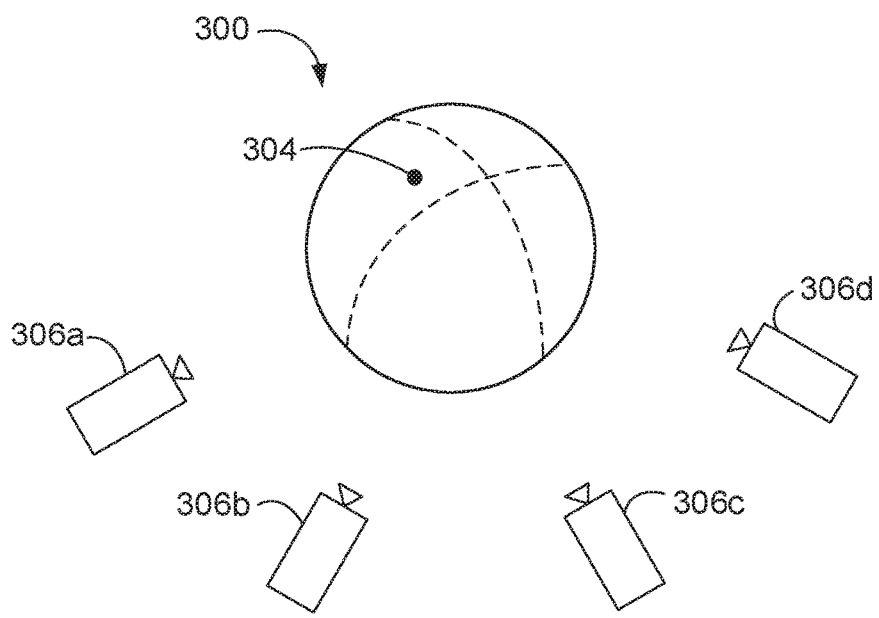
FIG. 3A is a block diagram of an object to be imaged, according to one embodiment.

FIG. 3A is a block diagram of an object 300 to be imaged, according to one embodiment. The object 300 to be imaged can be any real-world object for which a texture is desired, e.g., a human head of a real person for which a computer-readable texture of the real person is desired that can be applied to a 3D computer graphics representation of the person.

As shown, in one embodiment, multiple cameras 306a-306d can be used to capture respective images of the object 300. In another embodiment, a single camera can be used to capture images of the object 300 from different angles in succession.

On the object 300, a single point 304 is indicated as an example of a point that may be visible in one or more of the images captured by the cameras 306a-306d. The point may be vertex or polygon of a polygonal mesh of 3D representation of the object 300.

In one embodiment, the multiple cameras 306a-306d may be positioned at various angles around the object 300 to capture images of the object 300. In another embodiment, a single camera (e.g., camera 306a) may be used to capture multiple images from various angles while the object 302 is stationary. Additionally or alternatively, images of the object may be captured by one or more cameras at different distances from the object 302.

In an illustrative example, one or more of the cameras 306a-306d may be included in a camera-equipped portable computing device (e.g., one or more smartphones). The one or more camera-equipped portable computing devices may capture images of the object 300 at different angles. In another illustrative example, one or more of the cameras 306a-306d may be general purpose or specialized still image cameras, which may be positioned around the object 300 to capture images of the object 300 at different angles and or distances. In either illustrative example, there may optionally be light sources and auto-focusing lenses that are synchronized with the cameras 306a-306d to produce high-quality images of the object 302 in the scene 300.

In various embodiments, the acquired images from the cameras 306a-306d may be pre-processed (e.g., by an application being executed by a computing device), to produce a polygonal mesh representing a scan model of the object 300. The processing workflow may then upload the acquired images, the scan model, and metadata associated with the acquired images to one or more servers or computing devices. The scan model may be transformed to align with a base polygonal mesh, which is compliant with the target application topology. Certain anatomical features (e.g., nose, eyes, lips, etc.) may be detected in the original images and projected onto the scan model using the metadata describing the camera position for each image. The base polygonal mesh may then be transformed to align with the scan model, by minimizing the differences in curvatures, point positions, and point normal orientations (e.g., using the iterative closest point and/or simulated annealing optimization methods). The resulting polygonal mesh may than be further processed (e.g., to smooth the geometry, fit the eye balls, etc.).

Various textures, such as a light map, shaded color, color, normal, half bent normal, and occlusion textures, for the target application-resolution model and UV space layout may then be generated using the original images and the base polygonal mesh, as described in greater detail below. Texture space herein refers to a two-dimensional space that may be employed to represent a texture map of a three-dimensional object, where the letters U and V typically denote the axes of such space.

Figure 3B:
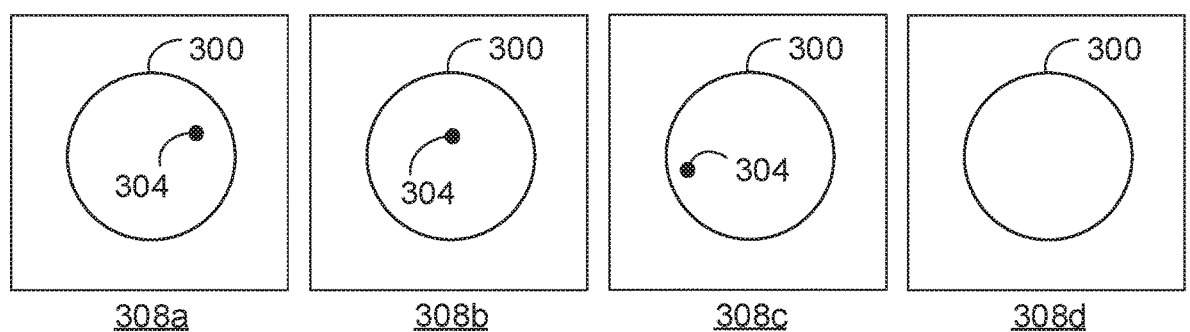
FIG. 3B is a block diagram of images captured by each camera, according to one embodiment.

FIG. 3B is a block diagram of images 308a-308d of the object 300 captured by each camera 306a-306d from FIG. 3A, according to one embodiment. There are four images 308a-308d of the object 300. As illustrated in FIG. 3B, in an embodiment, point 304 is visible in three of the four images (i.e., visible in images 308a-308c). Point 304 is not visible in the fourth image 308d because, for example, point 304 is on the back face of the object 300 with respect to the field of view of camera 306d and cannot be seen by camera 306d (e.g., assuming the object 300 is opaque).

In some embodiments, in order to determine if a given point on the object 300 is visible in a particular image, a depth test is performed. In an embodiment, each point of an object has an x, y, and z coordinate in 3D space. The z coordinate (or z-value) of a point on the object indicates the depth of the point (i.e., relative to a 3D position of the camera).

In one example, based on the angle of the camera with respect to the object, two points on the same object may have the same x and y coordinates, but different z coordinates.

This z-value indicates the depth of the two points with respect to the position of the camera. In one implementation, if two points on an object have the same x and y coordinates, the point with lower z-value (i.e., closer to the camera) is visible in the image captured by the camera and the point with the higher z-value will be obscured by the point with the lower z-value and will not be visible in the image captured by the camera.

For example, in FIG. 3B, in the image captured by camera 306d, the point 304 is located on the back face of the object 300 with respect to the orientation of camera 306d and thus cannot be seen by camera 306d. Therefore, in FIG. 3B, point 304 is not visible in image 308d captured by camera 306d. Instead, point 304 is obscured from camera 306d by another point on object 300 that has the same x and y coordinates as point 304, but a lower z-value than point 304 because it is closer in depth from the perspective of camera 306d.

In one embodiment, for each point that is visible in a given image, a data structure can be created that stores information about the visible points in the image. For example, various tree structures can be used, such as k-d trees. For each point that is visible, various information can be stored for the point, such as its brightness value and/or color information.

Figure 4:
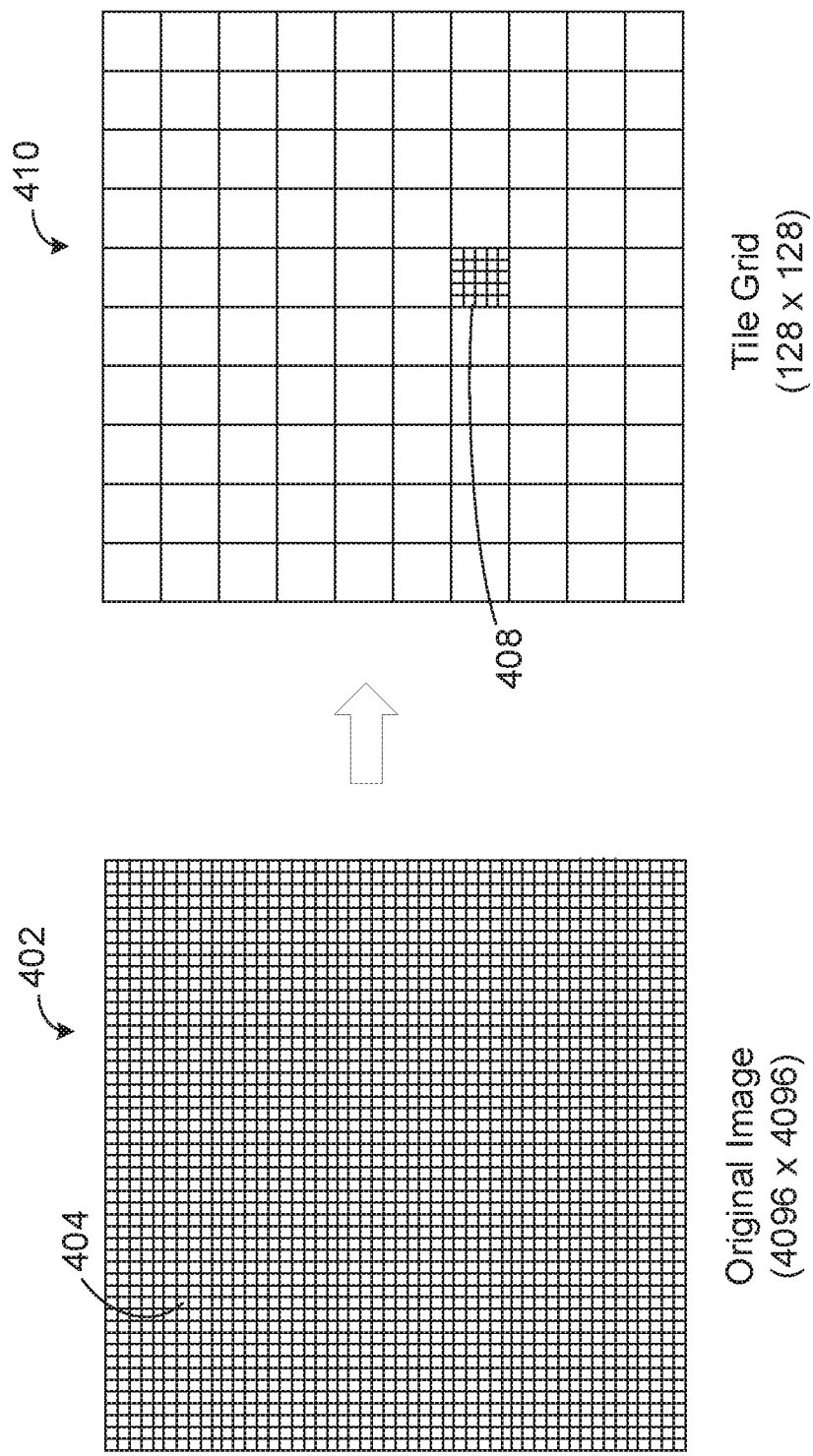
FIG. 4 is a block diagram of an image and a corresponding tile grid, according to an embodiment.

FIG. 4 is a block diagram of an image 402 and a corresponding tile grid 410, according to an embodiment. The original image 402 may be the image captured by a camera, such as one of the cameras 306a-306d in FIG. 3A. The image 402 may be a high resolution image, e.g., 4 k×4 k (4096 pixels×4096 pixels). In other embodiments, the image 402 may have any number of pixels. In some embodiments where the image 402 does not have dimensions that are a power of two (2), the image 402 can be padded to add pixels to one or more of its axes so that the padded image has dimensions that are a power of two (2). In the example shown in FIG. 4, while the original image 402 is not drawn to scale, the horizontal and vertical lines divide the original image 402 into individual pixels, such as pixel 404.

A tile grid 410 may be generated that can be overlaid onto the original image 402 to separate the original image 402 into an array of tiles, such as tile 408. In one example, the tile grid 410 may have dimension of 128×128 tiles, although any dimensions that are a power of 2 may be used. Each tile 408 of the tile grid 410 corresponds to one or more pixels of the original image 402.

Continuing with the example shown in FIG. 4, for an image 402 with dimensions having 4096×4096 pixels and a tile grid having 128×128 tiles, when the tile grid 410 is overlaid onto original image 402, each tile (e.g., such as tile 408) would include 32×32 pixels from the image 402.

Figure 5A:
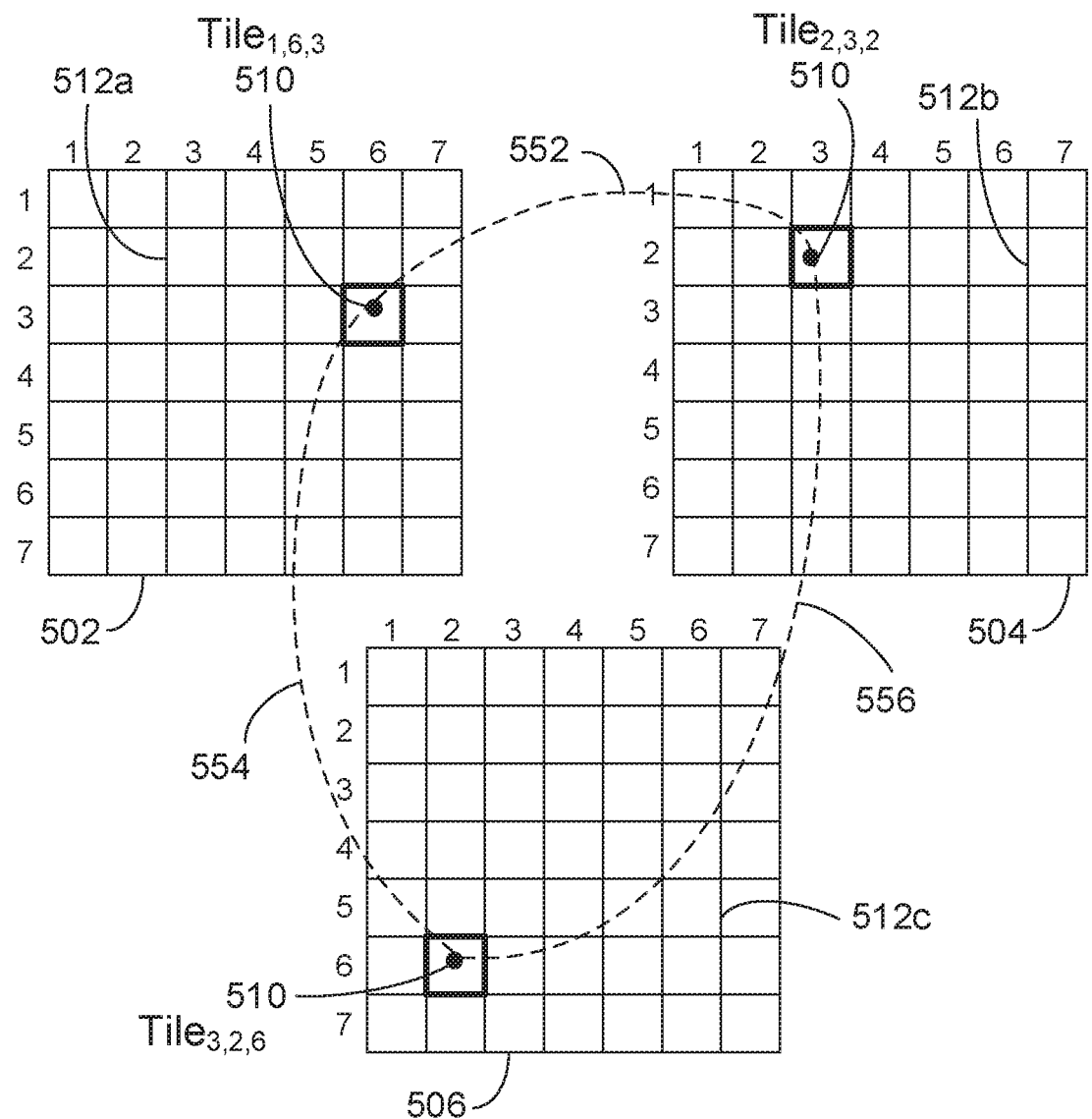
FIG. 5A is a block diagram illustrating an example of the same point on three different tile grids, according to an embodiment.

FIG. 5A is a block diagram illustrating an example of the same point 510 of an object on three different tile grids 512a-512c, according to an embodiment. As described, images of an object can be captured from different angles or perspectives. After a tile grid is overlaid onto the image, for each point that is visible in a given image, the point would map (i.e., be "binned") to a particular tile of the tile grid.

In the example in FIG. 5A, point 510 may be the same point that is it is visible in three different images 502, 504, and 506. Tile grids 512a, 512b, and 512c are overlaid on the images 502, 504, and 506, respectively. It should be understood that while tile grids having dimensions of 7×7 tiles are depicted in FIG. 5A for ease of visualizing and explaining, tile grids overlaid over images may be much larger (e.g., the 128×128 tile grid depicted in FIG. 4, which is also not drawn to scale). In some embodiments, the tile grid may have dimensions that are a power of two (2).

In FIG. 5A, point 510 is visible in each of the images 502, 504, and 506, but the location of point 510 is different in each of the images 502, 504, and 506. In the example shown, the location of point 510 in each image falls into a different tile in each image 502, 504, and 506. The location of point 510 may be designated by a notation that includes: (1) an image identifier, tile column identifier, and tile row identifier. For example, point 510 in image 502 is located at $Tile_{1,6,3}$ (i.e., image 1, column 6, row 3). Accordingly, point 510 on image 504 is located at $Tile_{2,3,2}$ and in image 506 at $Tile_{3,2,6}$. In some cases, a given point could be present in the same tile row and tile column in two different images.

After the tiles from different images that have the same visible point of an object are determined, tile pairs that share this same point from two or more images are identified. For example, as discussed above with respect to FIG. 5A, point 510 is visible in three different images 502, 504, and 506 of the object. As such, there are three different tile pairs for point 510. Tile pair 552 links $Tile_{1,6,3}$ from image 502 and $Tile_{2,3,2}$ from image 504, tile pair 554 links $Tile_{1,6,3}$ from image 502 and $Tile_{3,2,6}$ from image 506, and tile pair 556 links $Tile_{2,3,2}$ from image 504 and $Tile_{3,2,6}$ from image 506.

After the tile pairs that have at least one common point visible in both tiles of the tile pair are identified, brightness difference values are calculated for points that are visible in both tiles of the tile pair. While the same point might be visible in multiple images, the brightness value of the point may be different in each image. For example, different camera angles for capturing multiple images of the same object may experience different lighting conditions and/or shadows that may cause the point to be brighter in some images compared to other images. As another example, different distances between the camera and object may cause the point to be brighter when the camera captures an image of the object at a short distance from the object as opposed to when it captures an image of the object at a longer distance from the object.

FIG. 5B illustrates an example for calculating the bright difference value for the same point 510 in different images, according to an embodiment. As discussed above with respect to FIG. 5A, point 510 is visible in three images 502, 504, 506. Three brightness difference values are calculated for point 510, as illustrated in FIG. 5B. These three brightness difference values for point 510 are: (1) the brightness difference values of point 510 in between image 502 and image 504 (i.e., tile pair $Tile_{1,6,3}$:$Tile_{2,3,2}$), (2) the brightness difference values of point 510 in between image 502 and image 506 (i.e., tile pair $Tile_{1,6,3}$: $Tile_{3,2,6}$), and (3) the brightness difference values of point 510 in between image 504 and image 506 (i.e., tile pair $Tile_{2,3,2}$: $Tile_{3,2,6}$). In one embodiment, as discussed later in this disclosure, all of the brightness difference values that are common between points that are visible in both tiles of a tile pair are stored, and the median of these brightness difference values can be used to calculate an offset value for the tile pair. In other embodiments, a mean of brightness difference values can be used instead of the median for computing the offset value. In still further embodiments, a different percentile can be used instead for computing the offset value (i.e., using a "median" is using the 50th percentile). In still further embodiments, a "mode" can be used for computing the offset value (i.e., generating a histogram of differences and selecting an offset value corresponding to the histogram bin with the most values—the peak of the histogram).

Figure 6:
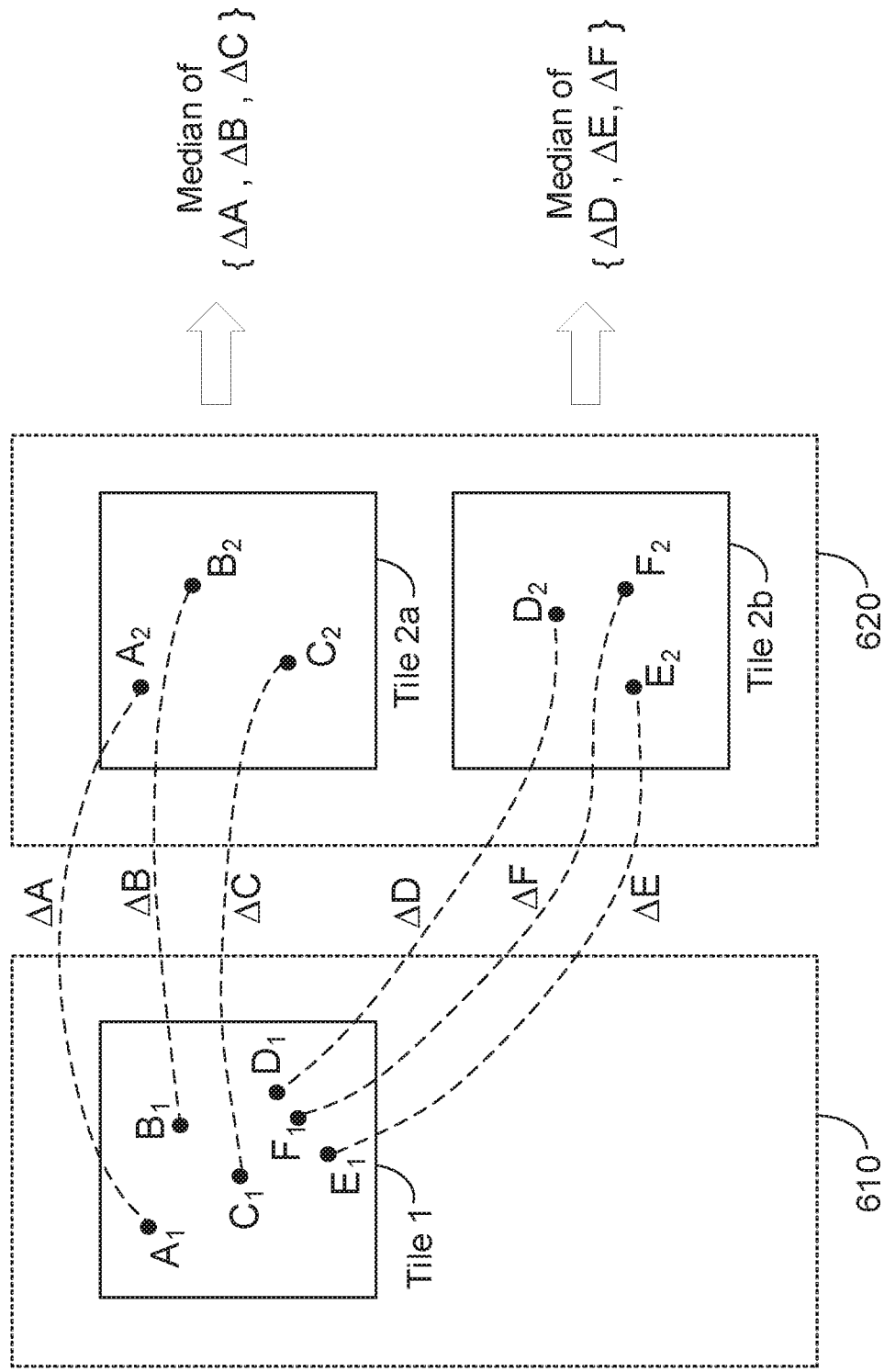
FIG. 6 is a block diagram illustrating an example for mapping identical points between tiles of two images, according to an embodiment.

FIG. 6 is a block diagram illustrating an example for mapping identical points between tiles of two images 610 and 620, according to an embodiment. One tile (i.e., "Tile 1") of image 610 is shown, and two tiles (i.e., "Tile 2a" and "Tile 2b") of image 620 are shown in the example in FIG. 6. In the example shown, Tile 1 from image 610 has six points: A, B, C, D, E, F. In image 610, these six points are designated as $A_1$, $B_1$, $C_1$, $D_1$, $E_1$, and $F_1$. Each of these six points is visible image 620. In image 620, these six points are designated as $A_2$, $B_2$, $C_2$, $D_2$, $E_2$, and $F_2$. In the example shown, points A, B, C from Tile 1 in image 610 are visible in Tile 2a in image 620, and points D, E, and F from Tile 1 in image 610 are visible in Tile 2b in image 620. As such, the set of points A, B, C, D, E, F creates two tile pairs among images 610 and 620, including tile pair "Tile 1: Tile 2a" and tile pair "Tile 1: Tile 2b".

For each point A, B, C, D, E, F, brightness values of the point in the different images can be stored in one or more look-up tables. Brightness difference values are computed for each point among image 610 and image 620. For point A, brightness difference value $\Delta A$ is computed as the difference of the brightness of $A_2$ minus the brightness of $A_1$. For point B, brightness difference value $\Delta B$ is computed as the difference of the brightness of $B_2$ minus the brightness of $B_1$. For point C, brightness difference value $\Delta C$ is computed as the difference of the brightness of $C_2$ minus the brightness of $C_1$. For point D, brightness difference value $\Delta D$ is computed as the difference of the brightness of $D_2$ minus the brightness of $D_1$. For point E, brightness difference value $\Delta E$ is computed as the difference of the brightness of $E_2$ minus the brightness of $E_1$. For point F, brightness difference value $\Delta F$ is computed as the difference of the brightness of $F_2$ minus the brightness of $F_1$.

In order to determine the median brightness difference value between a tile pair, the difference in brightness values for each common point between a tile pair is calculated. Based on the brightness values in the example above, for the tile pair "Tile 1: Tile 2a" a median is computed as the median of $\{\Delta A, \Delta B, \Delta C\}$. For the tile pair "Tile 1: Tile 2b" a median is computed as the median of $\{\Delta D, \Delta E, \Delta F\}$.

The computed median of the brightness difference values for a given tile pair provides an approximation of a brightness offset to normalize the brightness among the two tiles of the tile pair. This brightness offset can be used to form an equation that normalizes the brightness among the tiles of the tile pair, e.g., "Brightness_Tile$_1$+offset=Brightness_Tile$_2$". An equation system can be formed based computing the median brightness difference values for different tile pairs from the different images.

In an embodiment, the set of equations can be solved, e.g., using a least-squares method. Solving the set of equations generates, for each image (or more particularly, for each tile grid corresponding to an image), an offset matrix. The values of the offset matrix comprise brightness offset values to apply to each tile corresponding to the given image to normalize the brightness of the given image with the other images of the object. Further details about the normalization of the brightness of an image of an object are described later in this disclosure.

Figure 7:
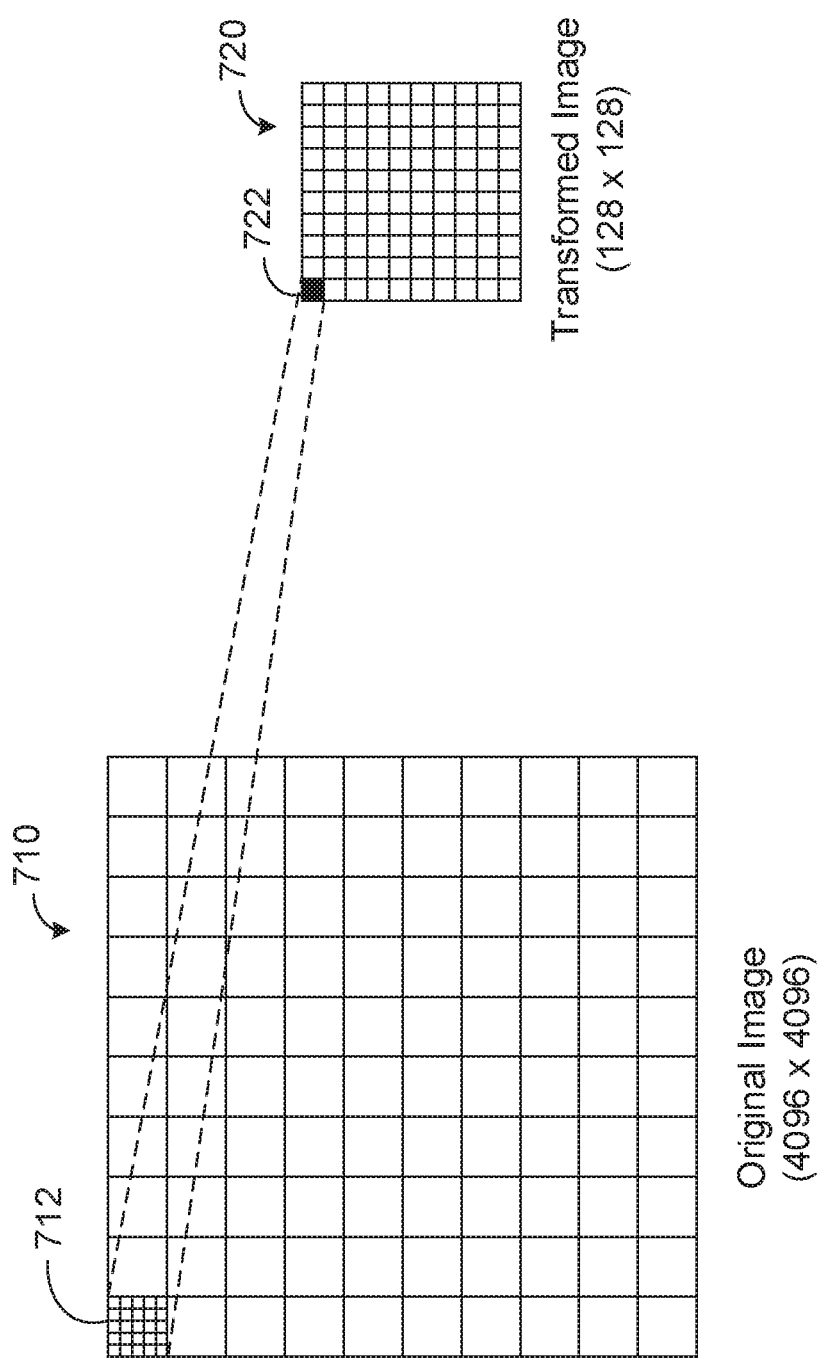
FIG. 7 is a block diagram illustrates performing a transformation on an image, according to an embodiment.

FIG. 7 is a block diagram illustrates performing a transformation on an image, according to an embodiment. FIG. 7 depicts an original image 710 (e.g., a high resolution 4 k×4 k image) that is transformed to match the dimensions of a tile grid (e.g., 128×128) used to compute brightness difference values, as described above. In one embodiment, image 710 is transformed by having a set of transformation operations performed on it to generate a transformed image 720 (e.g., a 128×128 resolution image). In an embodiment, the original image 710 may be transformed to by computing a truncated Laplacian pyramid for the original image 710.

In various embodiments, a variety of different transformation operations can be used to generate the transformed image 720 from the original image 710. Some examples are the discrete Fourier and discrete cosine transforms, the singular value decomposition, and the wavelet transform, of which the Laplacian pyramid and other subband transforms are examples.

In one implementation, the transformed image 720 is a pyramid representation of the original image 710. A pyramid representation, such a Laplacian pyramid representation, is a type of multi-scale signal representation developed by the computer vision, image processing and signal processing communities, in which an image is subject to repeated smoothing and subsampling. Pyramid representation is a predecessor to scale-space representation and multiresolution analysis. In a Gaussian pyramid, subsequent images are weighted down using a Gaussian average (i.e., Gaussian blur) and scaled down. Each pixel containing a local average corresponds to a neighborhood pixel on a lower level of the pyramid. This technique is used especially in texture synthesis. A Laplacian pyramid is very similar to a Gaussian pyramid but saves the difference image of the blurred versions between each levels. Only the smallest level is not a difference image, which enables reconstruction of the high resolution image using the difference images on higher levels. The Laplacian pyramid technique can be used in, for example, image compression.

As shown in the example in FIG. 7, a single given pixel in the transformed image 720 (e.g., pixel 722) corresponds to a set of pixels in the original image 710 (e.g., set of pixels 712). After performing the image transformation operation on the image 710, the transformed image 720 has the same dimensions as the dimensions of the tile grid (e.g., 128×128).

FIG. 8 is a block diagram illustrating the creation of a transformed offset image 830, according to an embodiment. An offset matrix 820 (e.g., a 128×128 matrix) described above with respect FIG. 6 is applied to a transformed image 810 (e.g., a 128×128 resolution image) described above with respect to FIG. 7 to generate a transformed offset image 830 that is identical in size (e.g., a 128×128 resolution image) to the transformed image 810. Because the offset matrix 820 is applied to the transformed image 810, the brightness of the transformed offset image 830 is adjusted at various portions of the image and is different in these portions than the brightness of the transformed image 810.

Figure 9:
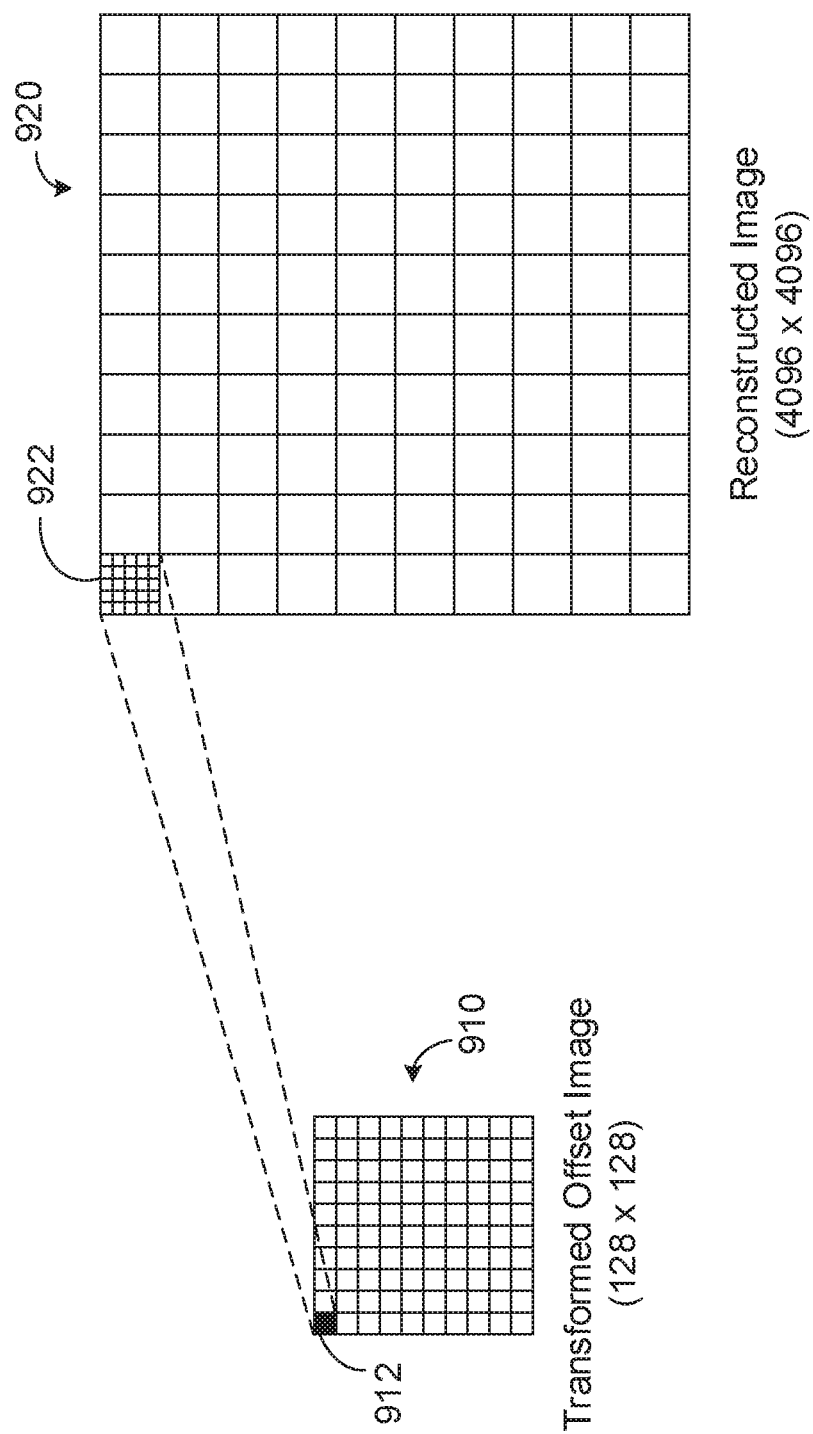
FIG. 9 is a block diagram illustrating generating a reconstructed image from a transformed offset image, according to an embodiment.

FIG. 9 is a block diagram illustrating generating a reconstructed image 920 from a transformed offset image, according to an embodiment. FIG. 9 depicts a transformed offset image 910, such as the one described with respect to FIG. 8, that is inversely transformed into a reconstructed image 920 (e.g., a high resolution 4K×4K image) by having a set of inverse transformation operations performed on it. As shown, one pixel 912 of the transformed offset image 910, after reconstruction, corresponds to a set of pixels 922 in the reconstructed image 920. The reconstructed image 920 is the same size as the original image 710, and thus, the subset of pixels 922 of the reconstructed image 920 has the same number of pixels as the subset of pixels 712 of the original image 710. Because the offset matrix used to adjust the brightness at different portions of the image is applied to the (smaller) transformed image, when the transformed offset image is reconstructed to its full size, these brightness changes are propagated to the reconstructed image smoothly without noisy artifacts. The process described in FIGS. 7-9 to generate a reconstructed image can be repeated for each different image of an object to generate a set of reconstructed images. The reconstructed images can then be combined using known techniques to generate a combined image. The combined image can be used, for example, as a texture to be applied to a 3D model of the object.

Figure 10:
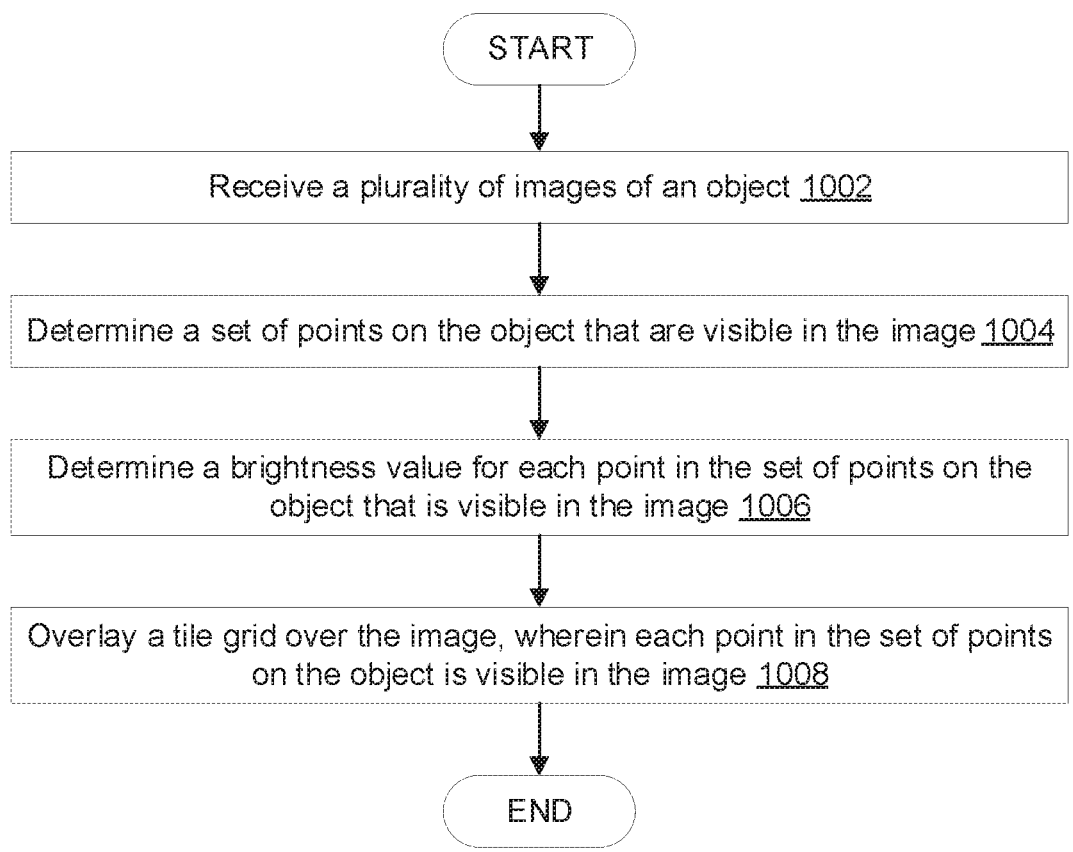
FIG. 10 is a flow diagram of method steps for overlaying a tile grid over an image, according to an embodiment.

FIG. 10 is a flow diagram of method steps for overlaying a tile grid over an image, according to an embodiment. In various implementations, the method can be performed by the processor 110, the graphics processor 116, or a combination of the processor 110 and the graphics processor 116.

As shown, the method begins at step 1002, where the processor receives a plurality of images of an object. The plurality of images of the object may be captured by one or more cameras. In an embodiment, the one or more cameras may capture the plurality of images of the object from different angles with respect to the object.

At step 1004, for each image in the plurality of images, the processor determines a set of points on the object that are visible in the image. In an embodiment, for a first image in the plurality of images, the processor determines the set of points on the object that are visible in the first image by creating a depth map of the points on the object. Based on the depth map of the points on the object, the processor determines the set of points on the object that are visible in the image.

At step 1006, for each image in the plurality of images, the processor determines a brightness value for each point in the set of points on the object that is visible in the image. In an embodiment, the processor may store the brightness value for each point in the set of points that are visible in a lookup table.

At step 1008, for each image in the plurality of images, the processor overlays a tile grid over the image. Each point in the set of points on the object that is visible in the image corresponds to one tile in the tile grid.

Figure 11:
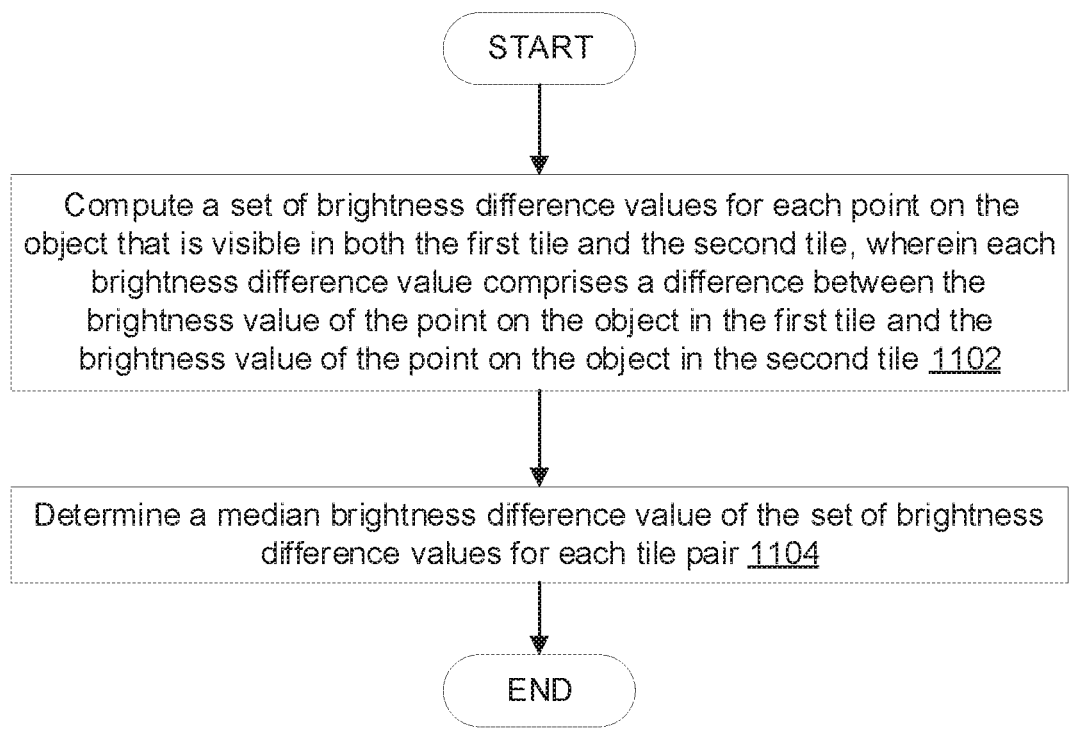
FIG. 11 is a flow diagram of method steps for determining brightness difference values for a tile pair, according to an embodiment

FIG. 11 is a flow diagram of method steps for determining brightness difference values for a tile pair, according to an embodiment. In various implementations, the method can be performed by the processor 110, the graphics processor 116, or a combination of the processor 110 and the graphics processor 116.

As described in FIG. 10, each point on an object that is visible in an image can be binned into a tile of a tile grid that is overlaid on the image. As shown, the method of FIG. 11 begins at step 1102, where for each tile pair comprising a first tile from a first image and a second tile from a second image (where at least one point on the object is visible in both the first tile and the second tile), the processor computes a set of brightness difference values for each point on the object that is visible in both the first tile and the second tile. Each brightness difference value comprises a difference between the brightness value of the point on the object in the first tile and the brightness value of the point on the object in the second tile. In an embodiment, the processor may compute the set of brightness difference values for each tile pair by reading brightness values that are stored in the lookup table.

At step 1104, for each tile pair comprising a first tile from a first image and a second tile from a second image (where at least one point on the object is visible in both the first tile and the second tile), the processor determines a median brightness difference value of the set of brightness difference values for each tile pair. In another embodiment, the mean of the brightness difference values of the set of brightness difference values is used.

Figure 12:
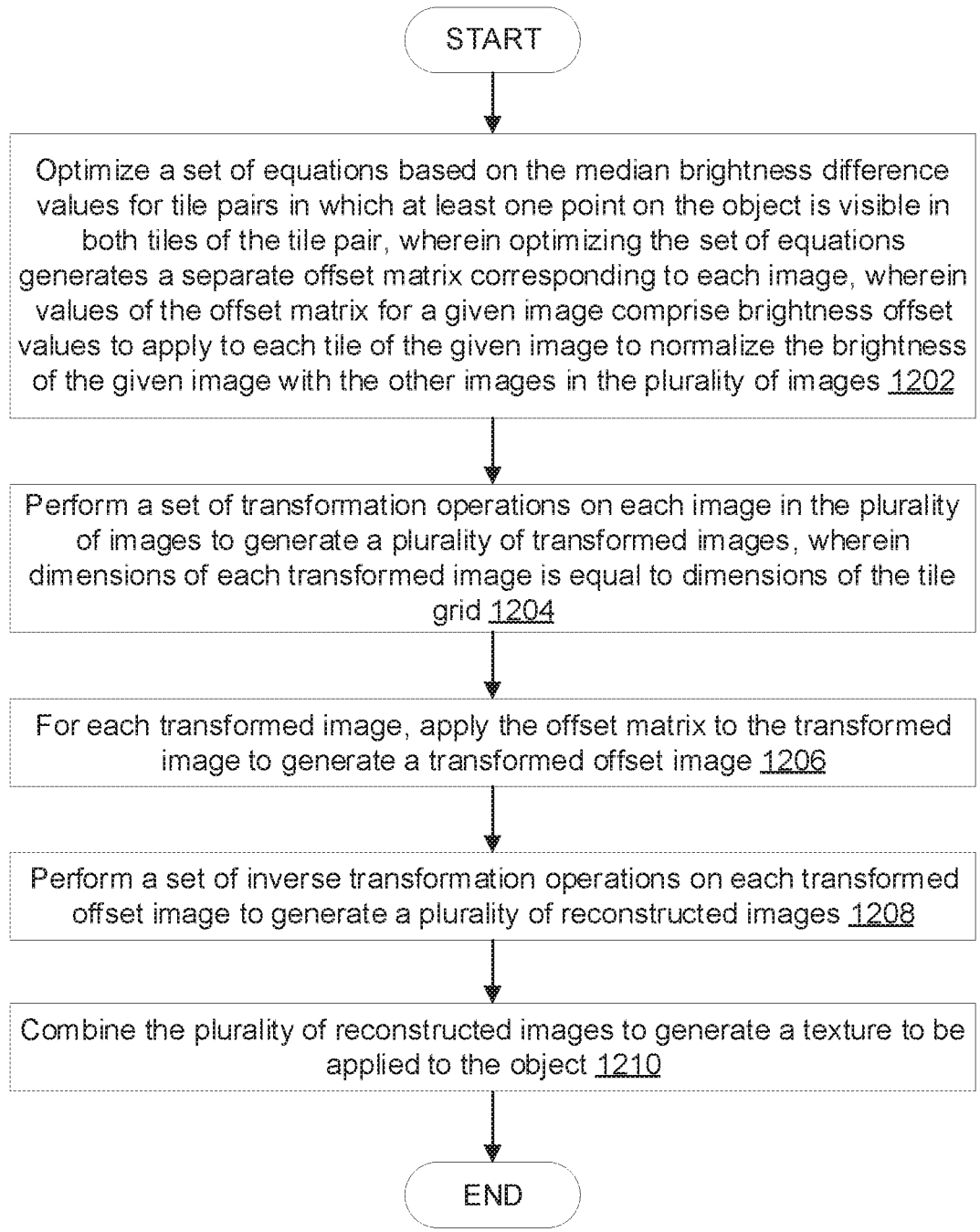
FIG. 12 is flow diagrams of method steps for generating a texture to be applied to an object, according to an embodiment.

FIG. 12 is a flow diagram of method steps for generating a texture to be applied to an object, according to an embodiment. In various implementations, the method can be performed by the processor 110, the graphics processor 116, or a combination of the processor 110 and the graphics processor 116.

As shown, the method begins at step 1202, where the processor optimizes a set of equations based on the median brightness difference values for tile pairs in which at least one point on the object is visible in both tiles of the tile pair. In an embodiment, a least-squares method is used to optimize the set of equations based on the median brightness values for tile pairs. Optimizing the set of equations generates a separate offset matrix corresponding to each image. Values of the offset matrix for a given image are brightness offset values to apply to each tile corresponding to the given image to normalize the brightness of the given image with the other images in the plurality of images.

At step 1204, the processor performs a set of transformation operations on each image in the plurality of images to generate a plurality of transformed images. As described, the dimensions of each transformed image is equal to dimensions of the tile grid.

At step 1206, for each transformed image, the processor applies the offset matrix to the transformed image to generate a transformed offset image.

At step 1208, the processor performs a set of inverse transformation operations on each transformed offset image to generate a plurality of reconstructed images.

At step 1210, the processor combines the plurality of reconstructed images to generate a texture to be applied to the object and the method ends.

Although embodiments of the disclosure are described in the context of normalizing the brightness values of two or more images, similar approaches can be used to normalize the color of corresponding points in two or more images.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An image processing method, the method comprising:
   receiving, by one or more processors, a plurality of images of an object;
   for each image in the plurality of images:
      determining, by the one or more processors, a brightness value for each point in a set of points on the object that is visible in the image; and
      generating, by the one or more processors, a tile grid for the image, wherein each point in the set of points on the object that is visible in the image corresponds to one tile in the tile grid;
   for each tile pair comprising a first tile from a first image and a second tile from a second image where at least one point on the object is visible in both the first tile and the second tile, determining, by the one or more processors, a brightness offset value for the tile pair;
   for each image in the plurality of images, generating, by the one or more processors, an offset matrix corresponding to the image, wherein values of the offset matrix for a given image comprise brightness offset values to apply to each tile of a tile grid for the given image to normalize the brightness of the given image with respect to the other images in the plurality of images;
   generating, by the one or more processors, a plurality of reconstructed images corresponding to the plurality of images, respectively, by performing operations comprising:
      for each image in the plurality of images, performing, by the one or more processors, a set of transformation operations on the given image to generate a transformed image, wherein dimensions of each transformed image are equal to dimensions of the tile grid;
      for each transformed image, applying, by the one or more processors, the offset matrix to the transformed image to generate a transformed offset image, wherein the offset matrix is the offset matrix for the given image that corresponds to the transformed image; and
      performing, by the one or more processors, a set of inverse transformation operations on each transformed offset image to generate the plurality of reconstructed images; and
   combining, by the one or more processors, the plurality of reconstructed images to generate a texture to be applied to a three-dimensional model of the object.

2. The method of claim 1, wherein determining a brightness offset value for a first tile pair comprises:
   computing, by the one or more processors, a set of brightness difference values for the first tile pair, wherein each brightness difference value comprises a difference between a brightness value of a point on the object that is visible in both tiles of the tile pair; and
   determining, by the one or more processors, a median brightness difference value of the set of brightness difference values for the first tile pair as the brightness offset value for the first tile pair.

3. The method of claim 2, further comprising:
   for each image in the plurality of images, storing, by the one or more processors, the brightness value for each point on the object that is visible in the image in a lookup table;
   wherein computing the set of brightness differences values for a tile pair comprises reading brightness difference values from the lookup table.

4. The method of claim 1, wherein generating, for each image in the plurality of images, the offset matrix corresponding to the image comprises:
   optimizing, by the one or more processors, a set of equations based on the brightness offset values for tile pairs in which at least one point on the object is visible in both tiles of the tile pair.

5. The method of claim 4, wherein a least-squares operation is performed to optimize the set of equations based on the brightness offset values for tile pairs.

6. The method of claim 1, wherein, for a first image in the plurality of images, performing the set of transformation operations on the first image to generate a transformed image for the first image comprises:
   computing, by the one or more processors, a truncated Laplacian pyramid of the first image.

7. The method of claim 1, further comprising:
   padding, by the one or more processors, each image in the plurality of images to have height and width dimensions that are a power of 2.

8. The method of claim 1, wherein the plurality of images are captured by one or more cameras, and wherein the plurality of images comprises images of the object from different angles.

9. The method of claim 1, wherein, for a first image in the plurality of images, determining brightness values for each point on the object that is visible in the first image comprises:
   creating, by one or more processors, a depth map for the first image of points on the object; and
   determining, by the one or more processors, a set of points on the object that are visible in the first image based on the depth map.

10. A non-transitory computer-readable medium storing instruction that, when executed by one or more processors, causes a computing device to perform image processing, by performing the steps of:
    receiving a plurality of images of an object;
    for each image in the plurality of images:
       determining a brightness value for each point in a set of points on the object that is visible in the image; and
       generating a tile grid for the image, wherein each point in the set of points on the object that is visible in the image corresponds to one tile in the tile grid;
    for each tile pair comprising a first tile from a first image and a second tile from a second image where at least one point on the object is visible in both the first tile and the second tile, determining a brightness offset value for the tile pair;
    for each image in the plurality of images, generating an offset matrix corresponding to the image, wherein values of the offset matrix for a given image comprise brightness offset values to apply to each tile of a tile grid for the given image to normalize the brightness of the given image with respect to the other images in the plurality of images;

generating a plurality of reconstructed images corresponding to the plurality of images, respectively, by performing operations comprising:

for each image in the plurality of images, performing a set of transformation operations on the given image to generate a transformed image, wherein dimensions of each transformed image are equal to dimensions of the tile grid;

for each transformed image, applying the offset matrix to the transformed image to generate a transformed offset image, wherein the offset matrix is the offset matrix for the given image that corresponds to the transformed image; and performing a set of inverse transformation operations on each transformed offset image to generate the plurality of reconstructed images; and combining the plurality of reconstructed images to generate a texture to be applied to a three-dimensional model of the object.

11. The computer-readable medium of claim 10, wherein determining a brightness offset value for a first tile pair comprises:

computing a set of brightness difference values for the first tile pair, wherein each brightness difference value comprises a difference between a brightness value of a point on the object that is visible in both tiles of the tile pair; and determining a median brightness difference value of the set of brightness difference values for the first tile pair as the brightness offset value for the first tile pair.

12. The computer-readable medium of claim 11, wherein the steps further comprise:

for each image in the plurality of images, storing the brightness value for each point on the object that is visible in the image in a lookup table;

wherein computing the set of brightness differences values for a tile pair comprises reading brightness difference values from the lookup table.

13. The computer-readable medium of claim 10, wherein generating, for each image in the plurality of images, the offset matrix corresponding to the image comprises:

optimizing a set of equations based on the brightness offset values for tile pairs in which at least one point on the object is visible in both tiles of the tile pair.

14. The computer-readable medium of claim 13, wherein a least-squares operation is performed to optimize the set of equations based on the brightness offset values for tile pairs.

15. The computer-readable medium of claim 10, wherein, for a first image in the plurality of images, performing the set of transformation operations on the first image to generate a transformed image for the first image comprises:

computing a truncated Laplacian pyramid of the first image.

16. The computer-readable medium of claim 10, wherein the plurality of images are captured by one or more cameras, and wherein the plurality of images comprises images of the object from different angles.

17. The computer-readable medium of claim 10, wherein, for a first image in the plurality of images, determining brightness values for each point on the object that is visible in the first image comprises:

creating a depth map for the first image of points on the object; and determining a set of points on the object that are visible in the first image based on the depth map.

18. A device for image processing, the device comprising:
a memory storing instructions; and
one or more processors configured to execute the instructions to cause the device to:

receive a plurality of images of an object;

for each image in the plurality of images:

determine a brightness value for each point in a set of points on the object that is visible in the image; and generate a tile grid for the image, wherein each point in the set of points on the object that is visible in the image corresponds to one tile in the tile grid;

for each tile pair comprising a first tile from a first image and a second tile from a second image where at least one point on the object is visible in both the first tile and the second tile, determine a brightness offset value for the tile pair;

for each image in the plurality of images, generate an offset matrix corresponding to the image, wherein values of the offset matrix for a given image comprise brightness offset values to apply to each tile of a tile grid for the given image to normalize the brightness of the given image with respect to the other images in the plurality of images;

generate a plurality of reconstructed images corresponding to the plurality of images, respectively, by performing operations comprising:

for each image in the plurality of images, performing a set of transformation operations on the given image to generate a transformed image, wherein dimensions of each transformed image are equal to dimensions of the tile grid;

for each transformed image, applying the offset matrix to the transformed image to generate a transformed offset image, wherein the offset matrix is the offset matrix for the given image that corresponds to the transformed image; and performing a set of inverse transformation operations on each transformed offset image to generate the plurality of reconstructed images; and combine the plurality of reconstructed images to generate a texture to be applied to a three-dimensional model of the object.

* * * * *